United States Patent
Bali et al.

(10) Patent No.: US 10,061,910 B2
(45) Date of Patent: Aug. 28, 2018

(54) SECURE BIOMETRIC DATA CAPTURE, PROCESSING AND MANAGEMENT FOR SELECTIVELY PROHIBITING ACCESS TO A DATA STORAGE COMPONENT FROM AN APPLICATION EXECUTION ENVIRONMENT

(71) Applicant: Intel Corporation, Santa Clara, CA (US)

(72) Inventors: Niraj Bali, Freemont, CA (US); Kumar N. Dwarakanath, Folsom, CA (US); Asaf Haskel, Jerusalem (IL); Gennadi Iosad, Jerusalem (IL); Anoop K. Jayasankaran, Sunnyvale, CA (US); Victoria C. Moore, Phoenix, AZ (US); Vinod Gomathi Nayagam, San Jose, CA (US); David Zahavi, Kfar Adumim (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/734,710

(22) Filed: Jun. 9, 2015

(65) Prior Publication Data

US 2016/0364559 A1 Dec. 15, 2016

(51) Int. Cl.
| | |
|---|---|
| G06F 21/32 | (2013.01) |
| H04L 9/32 | (2006.01) |
| G06F 21/60 | (2013.01) |
| G06F 21/62 | (2013.01) |
| G06K 9/00 | (2006.01) |
| H04L 9/08 | (2006.01) |
| G06F 21/74 | (2013.01) |

(52) U.S. Cl.
CPC .......... *G06F 21/32* (2013.01); *G06F 21/602* (2013.01); *G06F 21/62* (2013.01); (Continued)

(58) Field of Classification Search
CPC .... G06F 21/32; H04L 63/0861; H04L 9/3239
(Continued)

(56) References Cited

U.S. PATENT DOCUMENTS

2005/0244037 A1 11/2005 Chiu et al.
2008/0270787 A1 10/2008 LaCous
(Continued)

OTHER PUBLICATIONS

PCT Search Report & Written Opinion for PCT/US2016/031433, dated Aug. 17, 2016, 12 pages.

*Primary Examiner* — Eleni A Shiferaw
*Assistant Examiner* — Bryan F Wright
(74) *Attorney, Agent, or Firm* — Finch & Maloney PLLC

(57) ABSTRACT

A system includes one or more biometric sensors, a sensor hub and a trusted application execution environment. The sensor hub has exclusive access to the sensors and also isolates untrusted/unauthenticated portions of the operating system from direct access to unencrypted biometric data acquired by the sensors. During a biometric scan/collection process, only the sensor hub and a security engine can access the sensors and a storage component. The sensor hub reads the sensors to obtain the biometric data associated with the scan/collection process and stores the biometric data in the storage component. The security engine encrypts the biometric data before the sensor hub removes the access restrictions. Various components transfer the encrypted biometric data from the storage component to the trusted environment, which hosts algorithms for processing the biometric data.

22 Claims, 7 Drawing Sheets

(52) U.S. Cl.
CPC .......... *G06F 21/6209* (2013.01); *G06F 21/74* (2013.01); *G06K 9/00087* (2013.01); *G06K 9/00885* (2013.01); *H04L 9/0866* (2013.01); *H04L 9/3239* (2013.01); *G06K 2009/00953* (2013.01); *H04L 2209/24* (2013.01)

(58) Field of Classification Search
USPC ........................................................ 713/189
See application file for complete search history.

(56) References Cited

U.S. PATENT DOCUMENTS

| | | | |
|---|---|---|---|
| 2009/0164797 A1* | 6/2009 | Kramer | G06F 21/32 713/186 |
| 2009/0287895 A1 | 11/2009 | Foley et al. | |
| 2010/0257369 A1* | 10/2010 | Baker | G06F 21/32 713/186 |
| 2012/0185698 A1* | 7/2012 | Fiske | G06F 21/32 713/186 |
| 2013/0042111 A1* | 2/2013 | Fiske | H04L 9/3239 713/170 |
| 2013/0065564 A1* | 3/2013 | Conner | G06K 19/0718 455/414.1 |
| 2014/0101453 A1 | 4/2014 | Senthurpandi | |
| 2014/0173639 A1* | 6/2014 | Stufflebeam | G06F 21/32 719/321 |
| 2015/0237046 A1* | 8/2015 | Chang | H04L 63/0861 726/7 |
| 2015/0350200 A1* | 12/2015 | Li | H04L 63/0861 726/8 |

\* cited by examiner

SECURE BIOMETRIC DATA CAPTURE, PROCESSING AND MANAGEMENT FOR SELECTIVELY PROHIBITING ACCESS TO A DATA STORAGE COMPONENT FROM AN APPLICATION EXECUTION ENVIRONMENT

BACKGROUND

In the field of information security, access control includes the selective restriction of access to a protected or otherwise secure resource. Such resources may contain sensitive or confidential information. Permission to access a resource occurs upon authentication of a user's identity. Passwords, security tokens and biometrics are commonly used for such authentication. These techniques provide varying levels of security. For example, password authentication is relatively easy to implement, but passwords are easily forgotten. Further, stolen or guessed passwords permit unauthorized access to restricted resources. A security token is a type of electronic key that, when used in conjunction with a password, can provide additional security. However, unauthorized access also occurs by users who illicitly intercept security tokens. Biometrics authentication provides more security than passwords and security tokens because biometric identifiers, such as fingerprints, include distinctive and measurable physical characteristics, which are difficult to reproduce. Securing data representing biometric information reduces theft and misappropriation.

DETAILED DESCRIPTION

Figure 1:
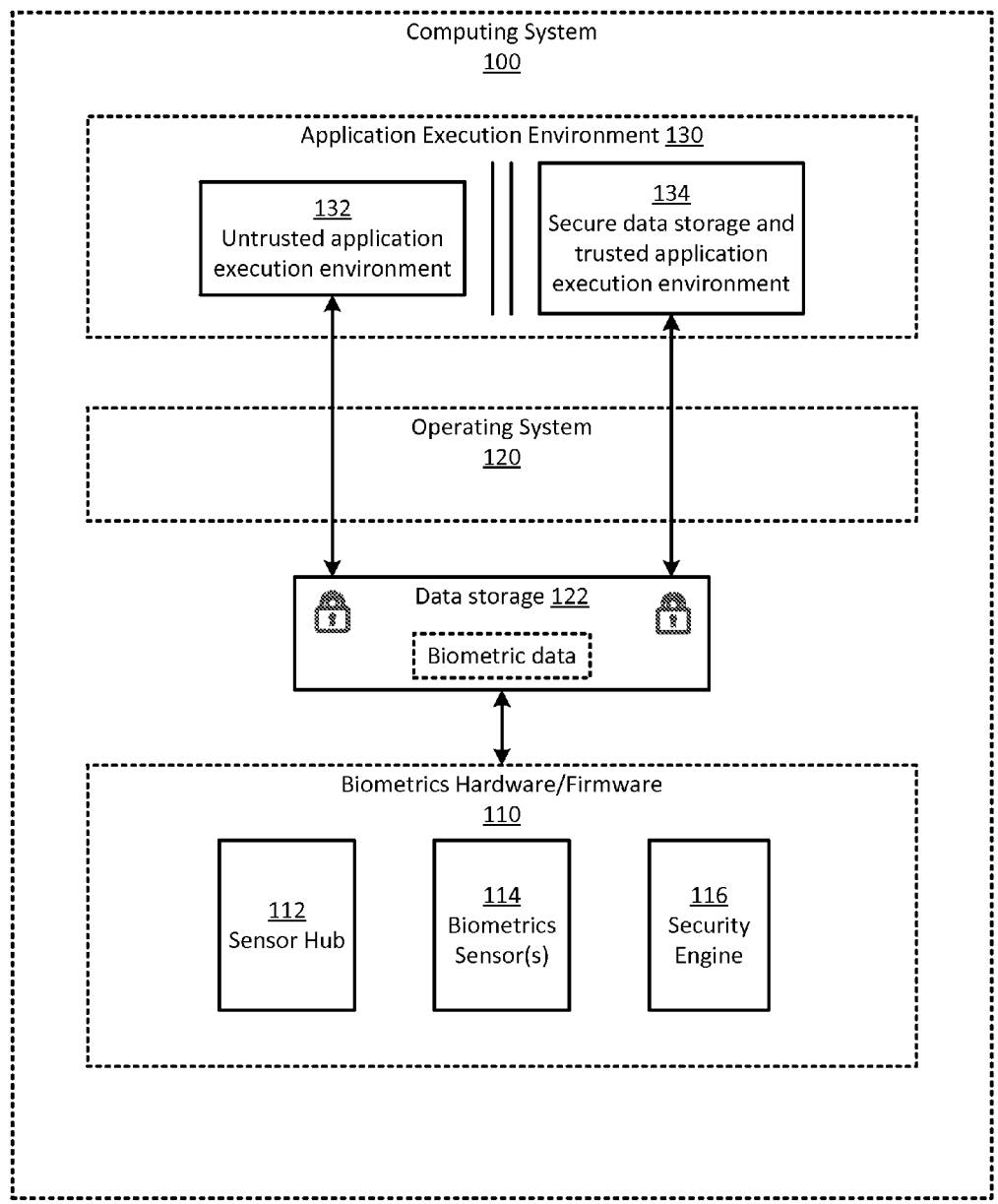
FIG. 1 illustrates an example computing system configured for biometric data capture, processing and management, in accordance with an embodiment of the present disclosure.

Techniques are disclosed for biometric data capture, processing and management. In particular, according to an embodiment, a computing system, such as a smart phone, tablet or other computing device, is designed upon a framework that supports biometrics hardware, firmware, or a combination of hardware and firmware. The framework facilitates use of, among other things, an operating system, a trusted execution environment, and an untrusted execution environment. The biometrics hardware/firmware includes a sensor hub, one or more biometric sensors (e.g., fingerprint, iris, voice, to name a few), and a security engine. Each sensor captures, or scans, a biometric sample (e.g., fingerprint pattern, iris structural feature, voice pattern). Some sensors include a transducer configured to generate an electrical signal representing biometric data. The biometrics hardware/firmware includes authenticated logic or circuitry for exclusively controlling and reading the sensors, in accordance with an embodiment. In particular, the authenticated logic selectively isolates the biometrics hardware/firmware and unencrypted biometric sensor data from the remainder of the operating system and any applications, processes or components in at least the untrusted execution environment. Access to the biometric sensor(s) and the memory used to store unencrypted biometric data is limited to the sensor hub, the security engine, or both. The authenticated logic encrypts the biometric data before other components of the system transfer the data into the trusted execution environment. Further, biometric applications and data stored in the trusted execution environment are isolated from the untrusted execution environment and unauthenticated operating system processes. In this manner, only authenticated operating system processes and trusted components of the computing system have access to the sensor(s), and at all times biometric data are either encrypted or isolated from untrusted or unauthenticated components of the computing system. Numerous variations and configurations will be apparent in light of this disclosure.

General Overview

Challenge-response authentication is a computer security technique in which user identity authentication occurs when the user provides a valid answer (response) to a question (challenge) posed by an authentication authority. Passwords, security tokens and biometric fingerprints are several forms of challenge-response authentication. While passwords are easily implemented, they are also easily forgotten, stolen or otherwise compromised. Likewise, security tokens are easily lost or stolen. In contrast to passwords and security tokens, biometric information is an intrinsic characteristic that is unique to each individual. As such, users cannot lose, forget or easily steal biometrics, as is the case with passwords, security tokens and other forms of challenge-response authentication. However, once collected, biometric information in electronic form must be secured to prevent unauthorized tampering, interception or theft. For instance, an unauthorized user can obtain an insecurely stored fingerprint scan, and use it for an attack in which the unauthorized user spoofs or otherwise imitates the identity of an authorized user to gain illegitimate access to a protected resource. Further, illegitimate algorithms configured to access and manipulate the fingerprint scan data can override biometric data processing algorithms, which compromises the security the biometrics authentication intends to provide.

Thus, the present disclosure provides a new technique for secure biometric data capture, processing and management, in accordance with various embodiments. In an embodiment, a computing system includes one or more biometric fingerprint sensors, a sensor hub, an untrusted application execution environment and a trusted application execution environment. The sensor hub has exclusive access to the sensors and also isolates untrusted or unauthenticated portions of the operating system, and other processes executing on the computing system, from direct access to unencrypted biometric data acquired by the sensors. In particular, during a fingerprint scan, the sensor hub prohibits access to the fingerprint sensors from other components of the system. The sensor hub reads the sensors to obtain the biometric data associated with the fingerprint scan and stores the biometric data in a data storage component, such as a memory stack or register. Only the sensor hub and the security engine can access the data storage component. In some embodiments, the security engine encrypts the biometric data stored in the data storage component before the sensor hub removes the data storage and sensor access restrictions. In some embodiments, the security engine processes the biometric data associated with the fingerprint scan and transfers a verifiable result to the trusted application execution environment for additional authorization processing. Various components of the system (e.g., a native library component) can subsequently transfer the encrypted biometric data from the memory storage component to the trusted and secure application execution environment. The trusted environment hosts algorithms for processing the biometric data. Further, processes executing outside of the trusted application execution environment cannot access the biometric data or the algorithms in the trusted application execution environment. While a fingerprint sensor is used in this example embodiment, other embodiments may employ other biometric sensors or any combination of such sensors and still operate in accordance with the techniques provided herein, as will be apparent in light of this disclosure.

As used in this disclosure, the term "biometrics" refers to a measureable biological characteristic and a process for recognizing an individual possessing the biological characteristic. The biological characteristic is, in some cases, anatomical or physiological, including fingerprints, palm features (e.g., veins), face features, DNA, signatures, voice features, hand features (e.g., geometry), iris structure, retina features, and scent details, to name a few examples. Any such characteristics can be generally captured in the form of a biometric sample or data captured by a biometric sensor. The recognition process can include processing biometric data representing the biological characteristic to identify, and verify the identity of, an individual.

As used in this disclosure, the term "biometrics sensor" refers to a device configured to acquire the data needed for biometrics recognition and verification. Such devices may include, for example, fingerprint sensors, retina and iris sensors, cameras, microphones, and other such tools capable of collecting biometrics. For example, a fingerprint sensor may incorporate feature detection technologies such as optical fingerprint imaging, ultrasonic imaging, and capacitance imaging to capture details of a person's fingerprints. An iris recognition sensor may incorporate video camera technology with near infrared illumination to capture images of a person's iris structure. A face recognition sensor may incorporate high resolution video camera technology (e.g., pixel resolution, spatial resolution, spectral resolution, temporal resolution, and radiometric resolution) to capture high resolution images of a person's distinctive facial features. A voice recognition sensor may include a microphone and possibly one or more audio filters, to capture a person's speech patterns. In some embodiments, a combination of such sensors may be used, to further increase security. In some embodiments, a sensor includes a transducer configured to generate an electrical signal representing biometric data.

As used in this disclosure, the term "biometric template" refers to a digital representation of one or more biometric samples. For example, a fingerprint scan obtained using a fingerprint sensor may be converted into a biometric template that uniquely corresponds to a particular individual's fingerprint. Various models and algorithms generate the biometric template and compare previously stored templates against candidate fingerprints for authentication purposes. For example, an image- or pattern-based algorithm may generate a template or compare two or more templates containing the type, size, shape and orientation of patterns that form the fingerprint.

As used in this disclosure, the terms "biometric verification" and "biometric authentication" refer to a process for confirming the identity of an individual by acquiring a biometric sample, such as a fingerprint scan or a voice scan or a face scan or an iris scan, and comparing the captured sample against a previously validated sample enrolled in a database. Verification or authentication results when a match between the samples occurs. A validated sample is one which has been vetted by a trusted party or otherwise considered authentic and valid by a security authority responsible for performing the verification or authentication process.

As used in this disclosure, the term "biometric identification" refers to a process for determining the identity of an individual by comparing a biometric sample, such as a fingerprint scan or a voice scan or a face scan or an iris scan, against one or more samples in a database to obtain a match. While in some cases verification and authentication may include identification, identification does not necessarily include a comparison with validated samples (e.g., identification may not lead to authentication).

Example System

FIG. 1 illustrates an example computing system 100 configured for biometric data capture, processing and management, in accordance with an embodiment. The system 100 may be implemented, for example, in a smart phone, tablet computer, mobile device, desktop device, or any other suitable computing device. The system 100 generally includes a biometrics component 110, an operating system 120, and an application execution environment 130. The biometrics component 110 may include, for example, hardware, firmware, or both (e.g., embedded code that is accessible and executable by one or more local processors of the system).

The biometrics component 110 includes a sensor hub 112, one or more biometrics sensors 114 (e.g., a fingerprint sensor), and a security engine 116. The sensor hub 112 includes circuitry and logic for interfacing other portions of the computing system 100 (e.g., via the operating system 120) with the biometrics sensor 114. The sensor hub 112 further includes circuitry and logic for controlling and capturing biometric samples from the biometrics sensor 114. The biometrics component 110 can operatively isolate the biometrics sensors 114 from direct access by the operating system 120 and the application execution environment 130. For example, the sensor hub 112 may include a common bus interface for communicating with the biometrics sensors 114. Examples of such a common bus interface include a serial peripheral interface (SPI) and an SPI controller (e.g., SSP6), I²C (inter-integrated circuit), universal asynchronous receiver/transmitter (UART) and Mobile Industry Processor Interface (MIPI). Examples of fingerprint biometrics sensors include, but are not limited to, capacitive sensors (Fingerprint Card 1020 Family, Synaptics 5100 family), optical (OxiTechnology all families of sensors, Authentic), and ultrasonic (UltraScan and Sonavation all families of sensors). As noted above, any of these sensors can include a transducer configured to generate an electrical signal representing biometric data. The security engine 116 may include any type of hardware or software-based security engine that provides cryptographic functionality in a secure execution environment. For example, the security engine 116 may implement defined security schemes to provide encryption and decryption capabilities for data acquired by the sensor hub 112, such as biometric data representing a fingerprint scan, and various other components of the system 100, as will be apparent in view of this disclosure.

The operating system 120 includes a data storage 122 (e.g., random-access memory, a data stack, or other data register). The biometrics component 110 has direct access to the data storage 122. The data storage 124 provides memory for storing biometric data received from the sensor hub 112. For example, the data storage 124 may temporarily store data representing a fingerprint scan before transfer of the data to the application execution environment 130 occurs. Further, the application execution environment 130 can access the data storage 122 via the operating system 120. However, the sensor hub 112 selectively prohibits access to the data storage from the application execution environment. For example, the sensor hub 112 may prohibit, in response to a request from the application execution environment 130 to capture a biometric sample, access to the data storage 122 from the application execution environment 130, either directly or via the operating system 120. This, in combination with the operatively isolated biometrics component 110, serves to protect unencrypted biometric data obtained from a biometric sample from read and write access by other portions of the computing system 100, including the operating system 120 and the application execution environment 130. The security engine 116 may, for example, encrypt the biometric data. Once the biometric data is encrypted, the sensor hub 112 allows access to the data storage 122 from the operating system 120 and the application execution environment 130.

The application execution environment 130 includes an untrusted application execution environment 132 and a trusted application execution environment 134. The untrusted application execution environment 132 includes additional data storage that is not necessarily secure or otherwise protected from access by any process executing on the computing system 100. For example, trusted or untrusted processes executing on the computing system 100 may access data stored in the untrusted application execution environment 132. Data stored or applications executing in the untrusted application execution environment 132 may include, for example, computer viruses or malicious content. Further, unauthorized or unauthenticated users, devices or applications may access or modify data and applications in the untrusted application execution environment 132. Thus, for certain purposes, such as protecting confidential information from theft or misuse, the untrusted application execution environment 132 may not be suitable for storing or processing the biometric data.

By contrast, the trusted application execution environment 134 includes data storage that is isolated from memory used by unauthorized or unauthenticated processes executing outside of the trusted application execution environment 134. Further, processes executing in the trusted application execution environment 134 have exclusive access to the data stored therein, to the exclusion of all processes executing outside of the trusted application execution environment 134. In this manner, the trusted application execution environment 134 securely quarantines certain data, including biometric data, stored therein from processes executing outside of the trusted application execution environment 134 (e.g., in the operating system 120 or the untrusted application execution environment 132). In some embodiments, the memory or other data storage elements forming portions of the untrusted application execution environment 132 can be physically separate from, or integrated with, the memory or other data storage elements forming portions of the trusted application execution environment 134, depending on the application. Further, in some cases, hardware (e.g., separate data buses, non-shared memory), firmware or software (e.g., segmentation, process isolation, virtual addressing, protection keys, privileges and permissions, address masks, etc.) can isolate one memory region of the system 100 from another.

Example Methodology

Figure 2A:
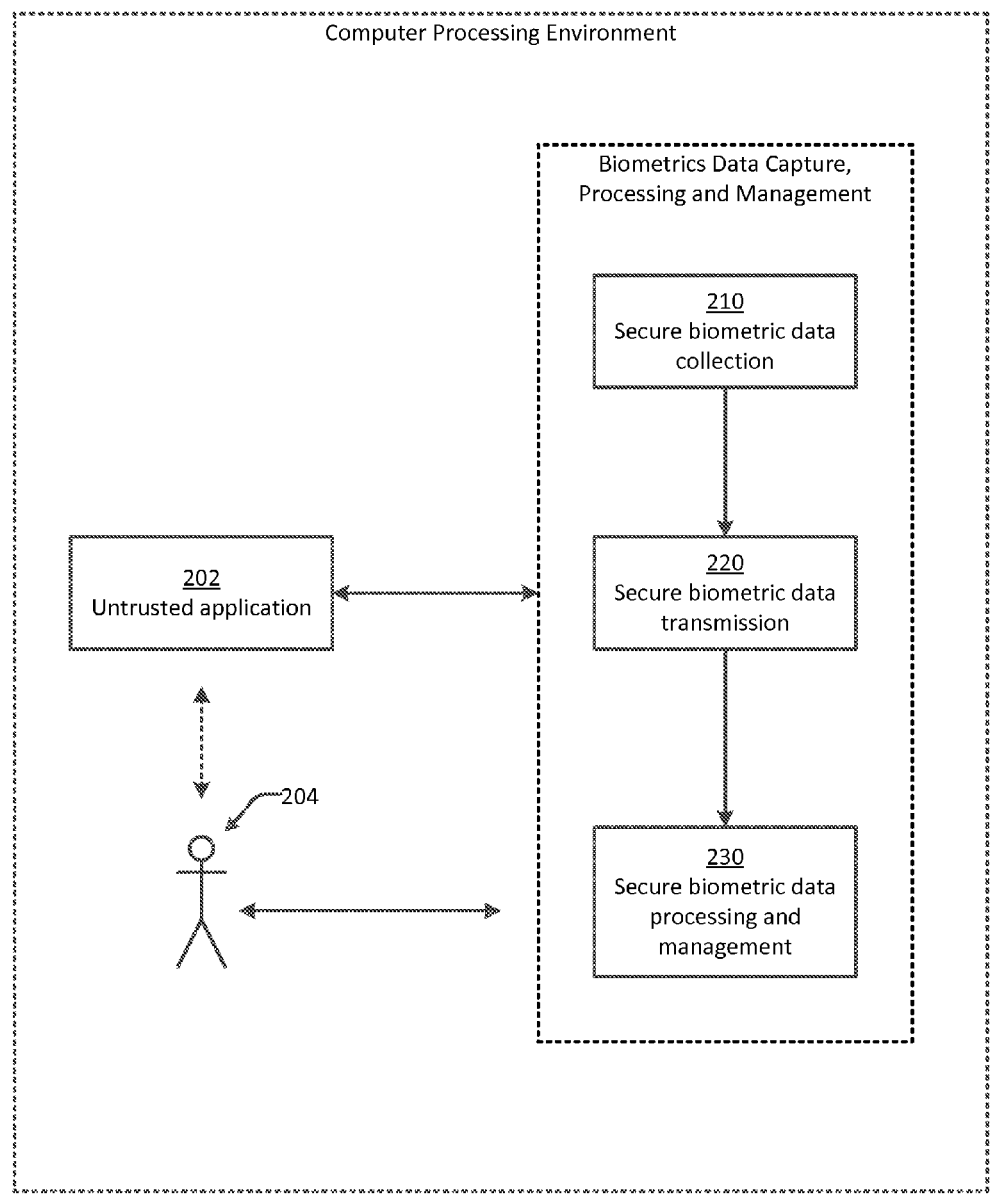
FIG. 2A is a flow diagram of an example methodology for biometric data capture, processing and management, in accordance with an embodiment of the present disclosure.
Figure 2B:
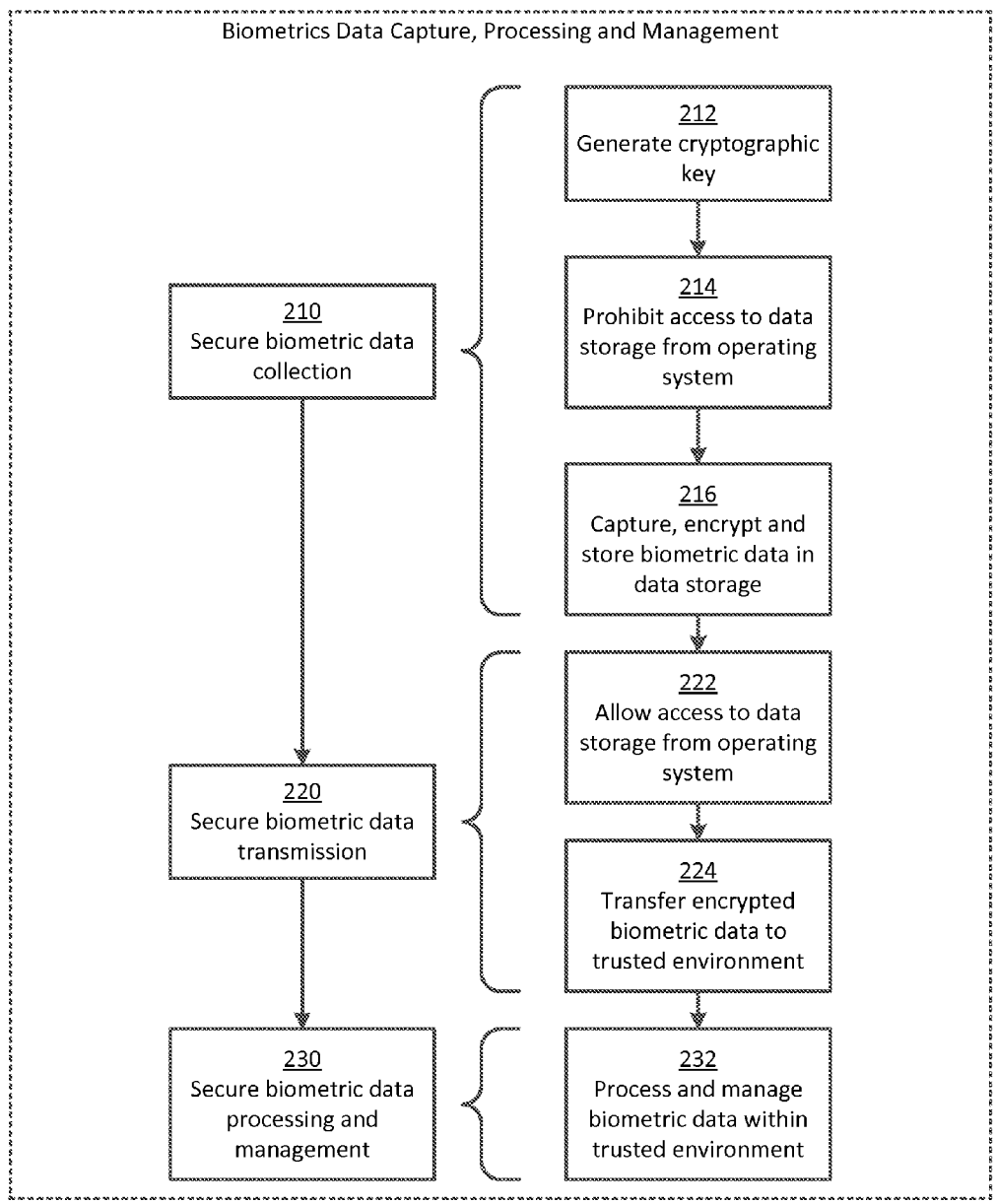
FIG. 2B is a flow diagram of the example methodology of FIG. 2A in further detail, in accordance with an embodiment of the present disclosure.

FIG. 2A is a flow diagram of an example methodology for biometric data capture, processing and management, in accordance with an embodiment. FIG. 2B is a flow diagram of the example methodology of FIG. 2A in further detail, in accordance with an embodiment. An untrusted application 202 executes in a portion of a computer processing environment, such as the untrusted application execution environment 132 of FIG. 1. The untrusted application 202 requests biometric authentication of a user 204. Such authentication may, for example, serve as a prerequisite for permitting the untrusted application 202 to access certain protected or secure information or perform certain functions that are restricted to authorized users. In some cases, other suitable authentication techniques, such as passwords or security tokens, may supplement biometric authentication. In response to the authentication request, a separate portion of the computer processing environment (e.g., the trusted application execution environment 134, the operating system kernel 120, the biometrics component 110, or any combination of these), which is independent of and isolated from the untrusted application 202, collects 210 biometric data (e.g., a fingerprint scan) from the user 204. Referring to FIG. 2B, the secure collection of biometric data 210 can include one or more of the following: generating 212a cryptographic key, prohibiting 214 access to a data storage from the operating system, and capturing, encrypting and storing 216 biometric data in the data storage.

Again referring to FIG. 2A, after collecting 210 the biometric data, the biometric data is transmitted 220 from one portion of the computer processing environment to another. Referring to FIG. 2B, the transmission of the biometric data 220 can include one or more of the following: allowing 222 access to the data storage from the operating system, and transferring 224 the biometric data from the data storage to a trusted environment. For example, with reference to FIG. 1, the biometric data may be transmitted from the biometrics component 110 to the operating system kernel 120 (e.g., the data storage 124), and further to the trusted application execution environment 134. The biometric data are transmitted 220 securely (e.g., in an encrypted form), such that the untrusted application 202 never has access to the biometric data in an unencrypted or otherwise unsecured form.

Again referring to FIGS. 2A and 2B, processing and management 230 of the biometric data occurs in a similarly secure manner independent of and separate from the untrusted application 202. For example, decryption and processing 232 of the biometric data may occur within the trusted environment to generate a template for enrolling a fingerprint scan or for validation against a previously enrolled fingerprint scan. Any cryptographic keys used to encrypt and decrypt the biometric data are never exposed to the untrusted application 202. As such, in this example framework and methodology, the untrusted application 202 never has direct access to the biometric data in an unencrypted or otherwise unsecured form, the biometrics component, or any process or communication channel that collects, transmits, processes or manages the biometric data in an unencrypted or otherwise unsecured form.

Example Device

Figure 3:
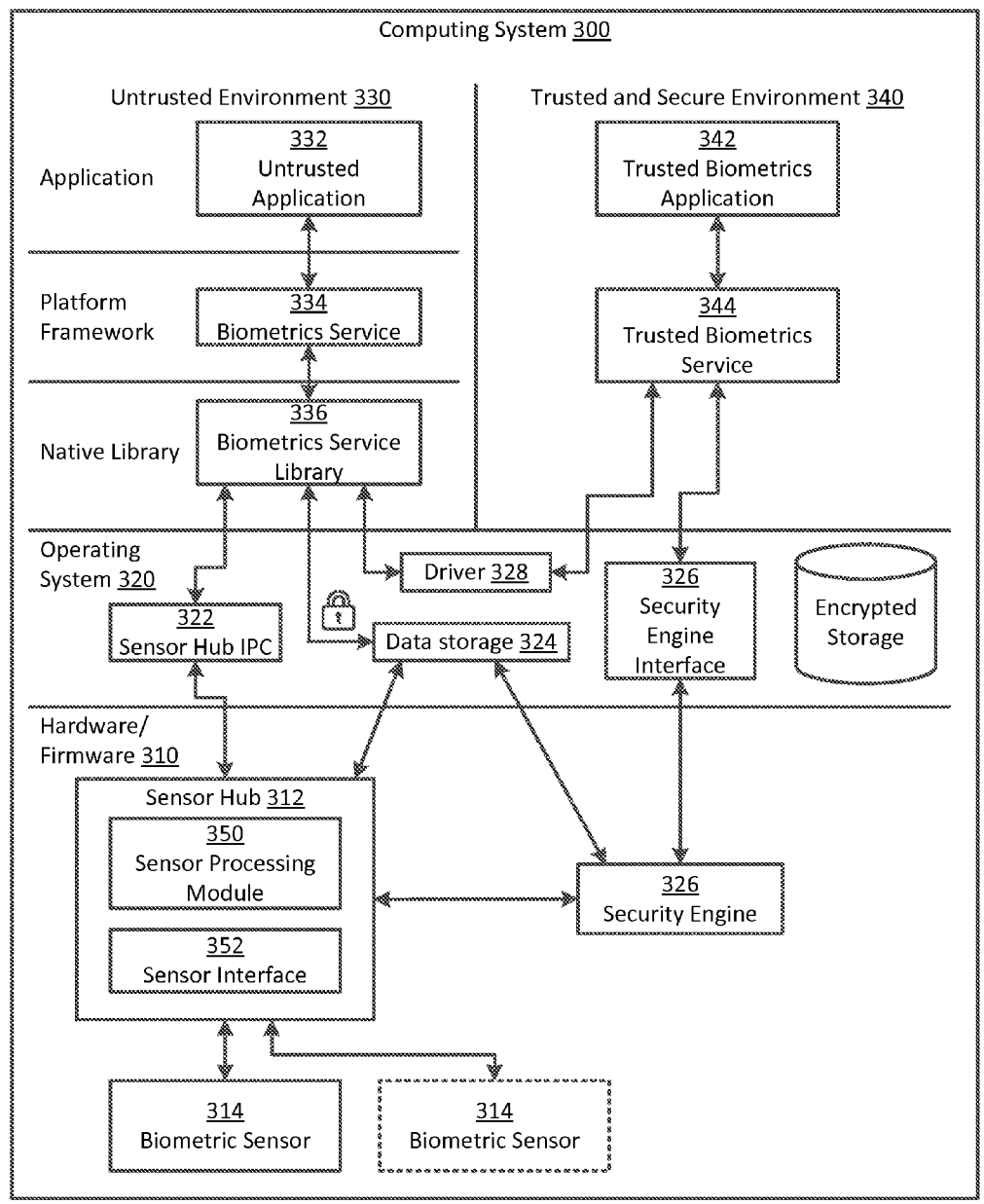
FIG. 3 illustrates an example computing device configured for biometric data capture, processing and management, in accordance with an embodiment of the present disclosure.

FIG. 3 illustrates an example computing device 300 configured for biometric data capture, processing and management, in accordance with an embodiment. The computing device 300 includes a biometrics component 310, an operating system component 320, an untrusted environment component 330 and a trusted and secure environment component 340. The biometrics component 310 includes a sensor hub 312, one or more biometric fingerprint sensors 314, and a security engine 316. In some cases, the sensor hub 312 and the security engine 316 have exclusive access to the biometric fingerprint sensors 314 by configuring one or more access control registers (not shown) integrated into the computing device 300. The sensor hub 312 executes one or more applications or processes. These applications or processes can execute mutually exclusively of, and in isolation from, each other (e.g., no application or process on the sensor hub 312 may be aware of the presence of another, and no application or process on the sensor hub 312 may access the data of another). For example, each application or process in the sensor hub 312 may execute in a protection ring (e.g., Ring 3) architecture. The operating system component 320 includes a sensor hub inter-process communication (IPC) component 322, a data storage component 324, a security engine interface component 326, and a biometrics driver component 328. The untrusted environment 330 includes one or more of the following: an untrusted application 332, a biometrics service 334, and a biometrics service library 336. The biometrics service 334 may, for example, provide one or more application programming interfaces (APIs) for enrolling, verifying and identifying users via the biometrics hardware/firmware 310. In some cases, the untrusted application 332 can use any standard biometrics APIs to enroll, verify and identify users. The trusted and secure environment 340 includes one or more of the following: a trusted biometrics application 342 and a trusted biometrics service 344. In some embodiments, the sensor hub 312 may include one or more of the following: a sensor processing module 350 and a sensor interface 352.

The computing device 300 may be implemented in one or more mobile or desktop computing devices, such as a smart phone, tablet, desktop computer, user terminal, point-of-sale terminal, automated teller machine, vending machine, airport check-in system, embedded device controller, vehicle control system, facility access control system, or other device or system or combination of devices or systems in which biometrics are utilized for user identification and authentication.

In general, the computing device 300 operates in the following manner, according to an embodiment. The untrusted application 332 can include any application executing on the computing device 300 that involves biometric identification or authentication of a user. An example of such an application includes an online banking application that uses biometric information to identify and authenticate the user prior to allowing the user to perform certain financial transactions. For instance, instead of, or in addition to, logging into the banking application for a financial institution using a username and password, the untrusted application 332 obtains a fingerprint scan of the user. A comparison of biometric data obtained from the fingerprint scan to known and validated biometric data determines who the user is and whether the user is permitted to perform certain functions, such as checking an account balance, withdrawing or transferring funds, making a purchase, and other types of transactions that are available only to users authorized by the financial institution. Other examples of applications where biometric-based security can be used will be apparent in light of this disclosure.

The device 300 does not permit applications or other processes executing in the untrusted environment 330, including the untrusted application 332, to directly access sensitive data that unauthorized users could exploit for improper purposes or otherwise misuse. As such, the device 300 does not permit the untrusted application 332 to access or otherwise intercept or manipulate biometric data, at least in an unencrypted form. Instead, the untrusted application 332 achieves biometric-based identification or authorization indirectly via a request sent to other components of the computing device 300, including but not limited to the trusted biometrics application 342, the data storage component 324, and the biometrics component 310. In accordance with various embodiments, such other components are designed to maintain the integrity and security of biometric data, and further designed to isolate the biometrics component 310 and data storage 324 from the untrusted environment. The request may include, for example, a request to enroll a new fingerprint scan into a database or to authenticate a new fingerprint scan against a previously enrolled fingerprint scan, and to return a result of such enrollment or authentication, such as "succeed" or "fail." In some cases, the biometrics service 334 provides one or more APIs that facilitate submission of the request from the untrusted application 332 to various other components of the computing device 300, such as the sensor hub IPC 322.

In response to receiving a biometrics request from the untrusted application 332, the driver 328 sends a command to the trusted biometrics application 342 via the trusted biometrics service 344 to generate a cryptographic key for encrypting biometric data captured from the biometric fingerprint sensor 314. The trusted biometrics application 342 generates the cryptographic key and supplies the key to the security engine 316 via the security engine interface 326. Additionally, in response to receiving a biometrics request, the sensor hub IPC 322 sends a command to the sensor hub 312 and the fingerprint sensor 314 to capture a biometric sample. The data storage 324 is shared between the operating system 320, the sensor hub 312 and the security engine 326. The sensor hub 312 locks the data storage 324 before capturing the biometric sample to prohibit the operating system 320 from accessing the data storage 324. Next, the sensor processing module 350 uses the sensor interface 352 to acquire raw biometric data representing the biometric sample, and stores the raw biometric data in the data storage 324. The sensor processing module 350 calls the security engine 326 to encrypt the raw biometric data using the cryptographic key before sending the biometric data to the operating system 320. The sensor hub 312 unlocks access to the data storage 324 once the biometric data stored in the data storage has been encrypted.

Next, the sensor hub IPC 322 collects the encrypted biometric data from the data storage 324 and copies it to a buffer in the untrusted environment 330. The biometrics service library 336 then transfers the encrypted biometric data to the trusted and secure environment 340. Upon receiving the encrypted biometric data, the trusted biometrics application 342 decrypts the data using the same cryptographic key used by the security engine 316 to encrypt the biometric data. The trusted biometrics application 342 checks the biometric data for integrity and validity, preprocesses the data, extracts a biometric template, and stores the template in an encrypted form or compares the template against a previously enrolled template. All of these functions are performed within the trusted and secure environment 340, which ensures the security of the biometric data and the templates against access from the untrusted environment 330 or the operating system 320. Another example of the operation and use of the computing device 300 is provided in further detail with respect to FIG. 4.

Example Methodology

Figure 4:
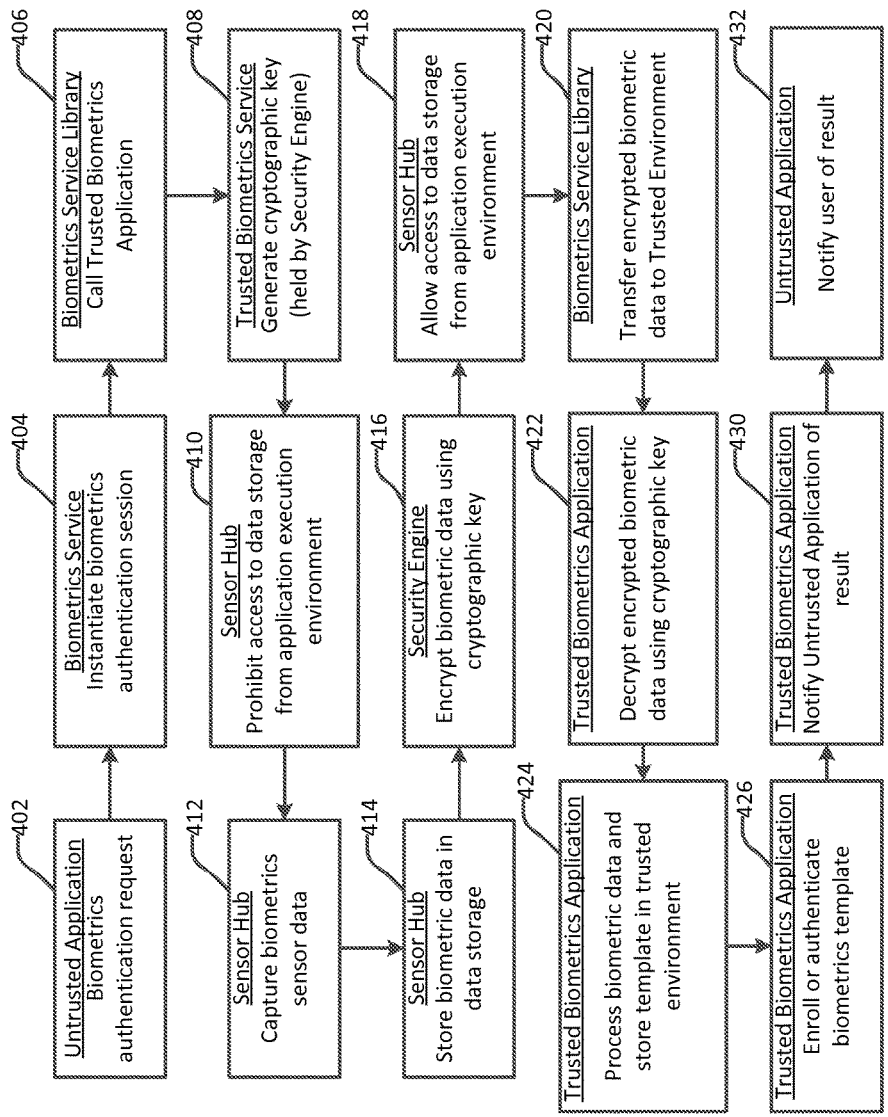
FIG. 4 is a flow diagram of another example methodology for biometric data capture, processing and management in a computing environment, in accordance with an embodiment of the present disclosure.

FIG. 4 is a flow diagram of another example methodology for biometric data capture, processing and management in a computing environment, in accordance with an embodiment. For clarity, in FIG. 4, various steps of the example methodology are defined with respect to the various components of the computing device of FIG. 2. However, some or all of these steps may be performed by components that are different than those expressly referenced in this example embodiment, including components that are combinations of separately described components, components that are subsets of individually described components, components that are remote from the computing environment (e.g., a client-server scheme), or components located in separate computing environments or separate portions of a computing environment. Furthermore, performance of one or more of these steps may occur in different sequences than those expressly described in this example embodiment, or omitted entirely. Accordingly, the example flow diagram of FIG. 4 only provides a general overview of one example methodology, and does not limit the scope of various other embodiments.

Generally, during a biometrics authentication session, the example methodology includes one or more of the following actions: generating a cryptographic key for encrypting and decrypting biometric data, restricting biometrics hardware/firmware access to certain components in the computing environment, capturing biometric data (e.g., a fingerprint scan), encrypting and transferring the biometric data to a trusted environment, and further processing and storing the biometric data in the trusted environment. The example methodology can further include reporting the result of such processing to applications executing in the untrusted environment. For example, the result of a fingerprint scan enrollment or authentication may be reported to an untrusted application as a success or failure. In turn, the example methodology may grant or deny access by the untrusted application to a protected resource based on the result.

In further detail, initially, an untrusted application, which may execute in an untrusted environment, issues 402 a biometrics authentication request. Such a request may issue, for example, when the untrusted application needs to obtain authentication of a user for accessing a protected resource (e.g., data, services or applications) owned by the user or otherwise protected from unauthorized access on behalf of the user. Any application executing in the computing environment may issue a biometrics authentication request. Such applications are not limited to those executing in an untrusted environment and may include applications or other processes executing in other portions of the computing environment or in separate computing environments, including the trusted environment, the operating system kernel and any hardware or firmware. An untrusted biometrics service executing in the untrusted environment receives the biometrics authentication request. The untrusted biometrics service instantiates 404 a biometrics authentication session in which biometric data is captured, transmitted, processed, or managed. The biometrics authentication session may include one or more of the actions described with respect to FIG. 4. In response to instantiation of the biometrics authentication session, the untrusted biometrics service calls 406 a trusted biometrics application. The trusted biometrics application executes in a trusted environment, which may include isolated memory regions or other data storage components to which access is restricted to components executing in the trusted environment.

In response to receiving the call from the untrusted biometrics service, the trusted biometric application generates a cryptographic key 408 via a trusted biometrics service, also within the trusted environment. The trusted biometrics service may operate in conjunction with a security engine to generate the cryptographic key. For example, the trusted biometrics service may call the security engine requesting the cryptographic key, and the security engine may generate the cryptographic key on behalf of the trusted biometrics service and return the cryptographic key to the trusted biometrics service using a secure or dedicated communication channel. The security engine may also share the cryptographic key with, for example, the sensor hub.

Prior to scanning a fingerprint, access to a data storage component, such as a kernel stack, is restricted to a sensor hub, a security engine, or both 410 in the hardware/firmware of the computing environment. As a result, access to the kernel stack from the untrusted environment is not permitted. Access to the kernel stack is restricted so as to prevent untrusted or unauthenticated applications or components in the computing environment from gaining access to any unencrypted or otherwise unsecured biometric data acquired during the biometrics authentication session. After kernel stack access has been so restricted, biometric data is captured 412 from a fingerprint sensor and placed 414 on the kernel stack. In some cases, the captured biometrics sensor data can additionally or alternatively be stored in other data storage components within the hardware/firmware, kernel or trusted environment for which access is suitably restricted to authenticated or trusted components in the computing environment.

The sensor hub or the security engine encrypts 416 the biometric data using the cryptographic key while the biometric data resides on the kernel stack and while access to the kernel stack is restricted to the sensor hub, the security engine, or both. Subsequent to encrypting the biometric data, the sensor hub removes 418 the kernel stack access restriction, which allows access to the kernel stack from the application execution environment. The biometrics service library transfers 420 the encrypted biometric data to a trusted and secure environment, which is not directly accessible by the operating system or other untrusted processes and components of the computing environment.

Once the encrypted biometric data is transferred to the trusted environment, a trusted biometrics application decrypts 422 the encrypted biometric data using the cryptographic key and further processes 424 the biometric data. Such further processing may include, for example, generating a biometric template corresponding to the biometric data (e.g., fingerprint scan) or making additional authorization decisions based on the processed data received. A biometric template based on the biometrics sensor data may be stored in the trusted environment for future use during biometric validation, authentication or identification, as needed. The trusted environment provides secure data storage for the biometric template by ensuring that applications, processes or components outside of the trusted environment have no access to the biometric template. Isolated, protected or encrypted memory regions may, for example, provide secure storage of biometric data and templates. The trusted biometrics application enrolls or authenticates 426 the biometric template. For example, if a biometric sample is obtained from an individual for the first time, the resulting biometric template may be enrolled in a database for comparison with subsequently obtained samples. On the other hand, if a validated biometric template is already enrolled, the biometric template may be used for verification or authentication against the enrolled template. The untrusted application is subsequently notified of the result of the enrollment or authentication 430. For example, if the authentication results in a match between an enrolled biometric template and the current biometric template, the untrusted application may be notified that the user is authorized to access the protected resource. In some cases, the notification may include a security token or other information that the untrusted application can use to access the protected resource. Subsequent to the notification 430, the biometrics authentication session may end, and the untrusted application notifies 432 the user of the result. In some cases, the example methodology includes notifying the user of the untrusted application of the result of the biometric authentication (e.g., via a "pass" or "fail" message or other indication). This example methodology may be repeated each time any application executing in the computing environment requests biometrics authentication.

Example System

Figure 5:
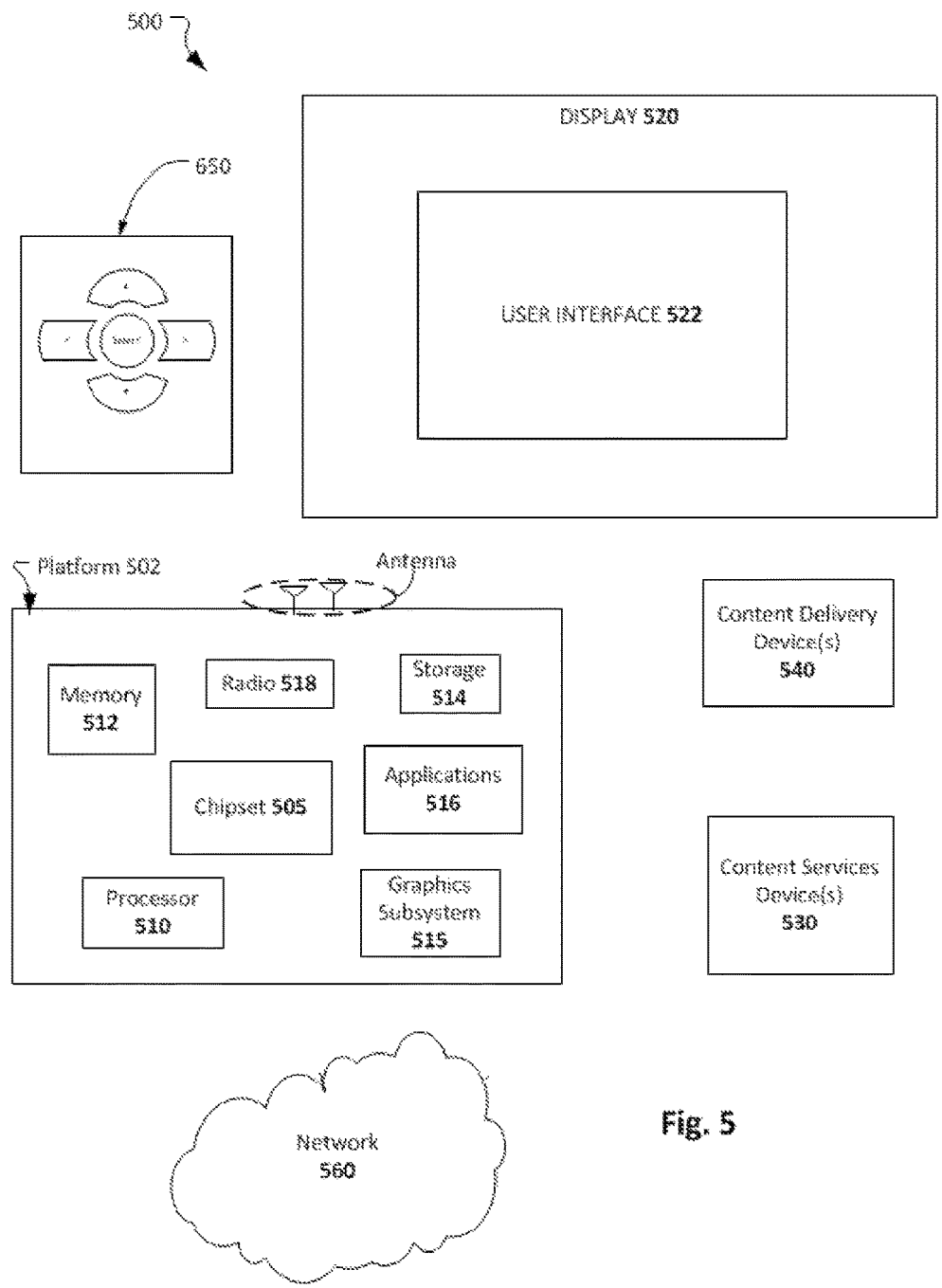
FIG. 5 illustrates a media system configured in accordance with an embodiment of the present disclosure.

FIG. 5 illustrates an example system 500 that may carry out techniques for biometric data capture, processing and management, in accordance with an embodiment. In some embodiments, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 500 includes a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these example components is described in more detail below.

In some embodiments, platform 502 includes any combination of a chipset 505, processor 510, memory 512, storage 514, graphics subsystem 515, applications 516 and/or radio 518. Chipset 505 provides intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 510 includes dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 514 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 514 includes technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 can be integrated into processor 510 or chipset 505. Graphics subsystem 515 can be a stand-alone card communicatively coupled to chipset 505. The graphics and/or video processing techniques described herein may be implemented in various hardware architectures. For example, hardware assisted privilege access violation check functionality as provided herein may be integrated within a graphics and/or video chipset. Alternatively, a discrete security processor may be used. In still another embodiment, the graphics and/or video functions including hardware assist for privilege access violation checks may be implemented by a general purpose processor, including a multi-core processor.

Radio 518 can include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 520 includes any television or computer type monitor or display. Display 520 may comprise, for example, a liquid crystal display (LCD) screen, electrophoretic display (EPD or liquid paper display, flat panel display, touch screen display, television-like device, and/or a television. Display 520 can be digital and/or analog. In some embodiments, display 520 is a holographic or three-dimensional display. Also, display 520 can be a transparent surface that may receive a visual projection. Such projections may convey various forms of information, images, and/or objects. For example, such projections may be a visual overlay for a mobile augmented reality (MAR) application. Under the control of one or more software applications 516, platform 502 can display a user interface 522 on display 620.

In some embodiments, content services device(s) 530 can be hosted by any national, international and/or independent service and thus accessible to platform 502 via the Internet or other network, for example. Content services device(s) 530 can be coupled to platform 502 and/or to display 520. Platform 502 and/or content services device(s) 630 can be coupled to a network 560 to communicate (e.g., send and/or receive) media information to and from network 560. Content delivery device(s) 540 can be coupled to platform 502 and/or to display 520. In some embodiments, content services device(s) 530 includes a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, graphics, text, medical and gaming content, and so forth.

Content services device(s) 530 receives content such as cable television programming including media information, digital information, and/or other content. Examples of content providers may include any cable or satellite television or radio or Internet content providers. The provided examples are not intended to limit the scope of the present disclosure. In some embodiments, platform 502 receives control signals from navigation controller 550 having one or more navigation features. The navigation features of controller 550 may be used to interact with user interface 522, for example. In some embodiments, navigation controller 550 can be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 can be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522. In some embodiments, controller 550 is not a separate component but rather is integrated into platform 502 and/or display 520.

In some embodiments, drivers (not shown) include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 7.1 surround sound audio, for example. Drivers may include a graphics driver for integrated graphics platforms. In some embodiments, the graphics driver includes a peripheral component interconnect (PCI) express graphics card.

In various embodiments, any one or more of the components shown in system 500 can be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the scope of the present disclosure.

In various embodiments, system 500 can be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media include a wire, cable, metal leads, printed circuit board (PCB), backplane, switch fabric, semiconductor material, twisted-pair wire, co-axial cable, fiber optics, and so forth.

Platform 502 can establish one or more logical or physical channels to communicate information. The information may include media information and control information. Media information refers to any data representing content meant for consumption by a user. Examples of content include, for example, data from a voice conversation, videoconference, streaming video, email or text messages, voice mail message, alphanumeric symbols, graphics, image, video, text and so forth. Control information refers to any data representing commands, instructions or control words meant for used by an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 5.

Figure 6:
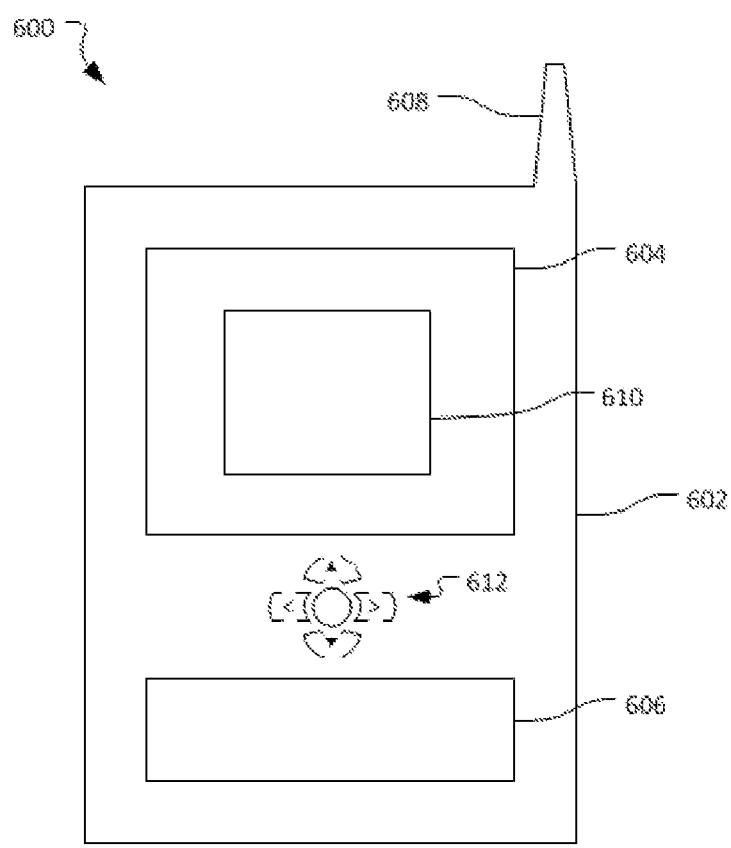
FIG. 6 illustrates a mobile computing system configured in accordance with an embodiment of the present disclosure.

As described above, system 500 may be embodied in varying physical styles or form factors. FIG. 6 illustrates embodiments of a small form factor device 600 in which system 500 may be embodied. In some embodiments, for example, device 600 may be implemented as a mobile computing device having wireless capabilities. A mobile computing device refers to any device having a processing system and a mobile power source or supply, such as one or more batteries, for example.

As previously described, examples of a mobile computing device include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments are described with a mobile computing device implemented as a smart phone, it will be appreciated that other embodiments may be implemented using other wireless mobile computing devices as well.

As shown in FIG. 6, device 600 includes a housing 602, a display 604, an input/output (I/O) device 606, and an antenna 608. Device 600 may, for example, include navigation features 612. Display 604 includes any suitable display unit for displaying information appropriate for a mobile computing device. I/O device 606 includes any suitable I/O device for entering information into a mobile computing device. Examples for I/O device 606 include an alphanumeric keyboard, a numeric keypad, a touch pad, input keys, buttons, switches, rocker switches, microphones, speakers, voice recognition device and software, and so forth. Information may be entered into device 600 by way of microphone. Such information may be digitized by a voice recognition device.

Various embodiments can be implemented using hardware elements, software elements, or a combination of both. Examples of hardware elements includes processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it will be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays.

Further Example Embodiments

The following examples pertain to further embodiments, from which numerous permutations and configurations will be apparent.

Example 1 is computing system including an application execution environment, an operating system, a data storage selectively accessible from the application execution environment via the operating system, and a biometrics component having direct access to the data storage. The biometrics component is configured to selectively prohibit access to the data storage from the application execution environment.

Example 2 includes the subject matter of Example 1, where the biometrics component comprises a biometrics sensor, and where the biometrics component is further configured to prohibit, in response to a request from the application execution environment to capture a biometric sample, access to the data storage from the application execution environment, capture the biometric sample with the biometrics sensor to obtain biometric data, encrypt the biometric data using a cryptographic key, store the encrypted biometric data in the data storage component, and allow access to the data storage from the application execution environment via the operating system subsequent to encrypting the biometric data.

Example 3 includes the subject matter of any of the above examples, where the biometrics component includes a biometrics sensor and a security engine, and where the security engine is configured to encrypt biometric data obtained from the biometrics sensor. The biometric sensor may be, for example, a fingerprint sensor, microphone, camera, or any other such tool that allows a biometric sample to be captured.

Example 4 includes the subject matter of any of the above examples, where the application execution environment includes an untrusted application execution environment having access to the data storage via the operating system, and a trusted application execution environment having access to the data storage via the operating system.

Example 5 includes the subject matter of Example 4, where the untrusted application execution environment is operatively isolated from the trusted application execution environment.

Example 6 includes the subject matter of any of Examples 4 and 5, where the operating system is configured to transfer the encrypted biometric data from the data storage to the trusted application execution environment.

Example 7 includes the subject matter of any of Examples 4, 5 and 6, where the trusted application execution environment includes a biometrics application configured to enroll a user based on biometric data obtained from a biometrics sensor, authenticate the user based the biometric data, or both.

Example 8 includes the subject matter of any of Examples 4, 5, 6 and 7, where the trusted application execution environment includes a biometrics application configured to decrypt encrypted biometric data obtained from a biometrics sensor using a cryptographic key.

Example 9 includes the subject matter of any of Example 4, 5, 6, 7 and 8, where the trusted application execution environment includes a biometrics application configured to process biometric data obtained from a biometrics sensor to generate a biometric template.

Example 10 is a method of capturing, processing and managing biometric data in a computing system. The method includes prohibiting, in response to a request from an application execution environment of the computing system to capture a biometric sample, access to a data storage component of the computing system from the application execution environment, capturing a biometric sample with a biometrics sensor to obtain biometric data, encrypting the biometric data using a cryptographic key, storing the encrypted biometric data in the data storage component, and allowing access to the data storage component from the application execution environment subsequent to encrypting the biometric data.

Example 11 includes the subject matter of Example 10, where the encrypting of the biometric data is performed by a biometrics component of the computing system independently of the operating system.

Example 12 includes the subject matter of any of Examples 10 and 11, where the method includes transferring, via the operating system, the encrypted biometric data from the data storage component to a trusted execution environment in the application execution environment, and where an untrusted execution environment in the application execution environment is operatively isolated from the trusted execution environment.

Example 13 includes the subject matter of Example 12, where the method includes generating the cryptographic key within the trusted execution environment.

Example 14 includes the subject matter of any of Examples 12 and 13, where the method includes decrypting the encrypted biometric data using the cryptographic key within the trusted execution environment.

Example 15 includes the subject matter of any of Examples 12, 13 and 14, where the method includes processing the biometric data to generate a biometric template within the trusted execution environment.

Example 16 includes the subject matter of any of Examples 12, 13, 14 and 15, where the method includes enrolling the user, authenticating the user based on the biometric data, or both.

Example 17 is a non-transient computer program product having instructions encoded thereon that when executed by one or more processors cause a process to be carried out. The process includes prohibiting, in response to a request from an application execution environment of the computing system to capture a biometric sample, access to a data storage component of the computing system from the application execution environment, capturing a biometric sample with a biometrics sensor to obtain biometric data, encrypting the biometric data using a cryptographic key, storing the encrypted biometric data in the data storage component, and allowing access to the data storage component from the application execution environment subsequent to encrypting the biometric data.

Example 18 includes the subject matter of Example 17, where the encrypting of the biometric data is performed by a biometrics component of the computing system independently of the operating system.

Example 19 includes the subject matter of any of Examples 17 and 18, where the process includes transferring, via the operating system, the encrypted biometric data from the data storage component to a trusted execution environment in the application execution environment, and where an untrusted execution environment in the application execution environment is operatively isolated from the trusted execution environment.

Example 20 includes the subject matter of Example 19, where the process includes generating the cryptographic key within the trusted execution environment.

Example 21 includes the subject matter of any of Examples 19 and 20, where the process includes decrypting the encrypted biometric data using the cryptographic key within the trusted execution environment.

Example 22 includes the subject matter of any of Examples 19, 20 and 21, where the process includes processing the biometric data to generate a biometric template within the trusted execution environment.

Example 23 includes the subject matter of any of Examples 19, 20, 21 and 22, where the process includes enrolling the user, authenticating the user based on the biometric data, or both.

The foregoing description of example embodiments has been presented for the purposes of illustration and description. This description is not intended to be exhaustive or to limit the present disclosure to the precise forms disclosed. Many modifications and variations are possible in light of this disclosure. This disclosure does not intend to limit the scope of the various embodiments. Future filed applications claiming priority to this application may claim the disclosed subject matter in a different manner, and may generally include any set of one or more limitations as variously disclosed or otherwise demonstrated herein.

What is claimed is:

1. A computing system, comprising:
an application execution environment;
an operating system;
a memory selectively accessible from the application execution environment via the operating system;
a biometrics sensor interface configured to capture a biometric sample from a biometrics sensor; and
a biometrics component including a sensor hub separate from the operating system, the sensor hub having direct access to the memory and the biometrics sensor interface, the sensor hub configured to
selectively prohibit, in response to a request from the application execution environment to capture a biometric sample, access to the memory from the application execution environment via the operating system while permitting direct access to the memory by the biometrics component,
capture the biometric sample from the biometrics sensor to obtain biometric data,
encrypt the biometric data using a cryptographic key,
store the encrypted biometric data in the memory,
deny access to the data storage from the application execution environment via the operating system until after the biometric data is encrypted, and
selectively permit access to the memory from the application execution environment via the operating system after the biometric sample is captured, encrypted, and stored in the memory,
wherein the biometrics component operatively isolates the biometrics sensor from direct access by the operating system and the application execution environment so that the biometric sample is securely captured and subsequently stored in the memory independently of the operating system.

2. The system of claim 1, wherein the biometrics component comprises the biometrics sensor, and wherein the biometrics component is further configured to:

capture the biometric sample from the biometrics sensor to obtain biometric data;
encrypt the biometric data using a cryptographic key;
store the encrypted biometric data in the memory; and
deny access to the data storage from the application execution environment via the operating system until after the biometric data is encrypted.

3. The system of claim 1, wherein the biometrics component comprises the biometrics sensor and a security engine, and wherein the security engine is configured to encrypt biometric data obtained from the biometrics sensor.

4. The system of claim 1, wherein the application execution environment comprises:
an untrusted application execution environment having access to the memory via the operating system; and
a trusted application execution environment having access to the memory via the operating system.

5. The system of claim 4, wherein the untrusted application execution environment is operatively isolated from the trusted application execution environment.

6. The system of claim 4, wherein the operating system is configured to transfer the encrypted biometric data from the memory to the trusted application execution environment.

7. The system of claim 4, wherein the trusted application execution environment comprises a biometrics application configured to at least one of enroll a user based on biometric data obtained from the biometrics sensor and authenticate the user based the biometric data.

8. The system of claim 4, wherein the trusted application execution environment comprises a biometrics application configured to decrypt encrypted biometric data obtained from the biometrics sensor using a cryptographic key.

9. The system of claim 4, wherein the trusted application execution environment comprises a biometrics application configured to process biometric data obtained from the biometrics sensor to generate a biometric template.

10. A method of capturing, processing and managing biometric data in a computing system having an application execution environment, an operating system, a memory selectively accessible from the application execution environment via the operating system, a biometrics sensor interface configured to capture a biometric sample from a biometrics sensor, and a sensor hub separate from the operating system, the sensor hub having direct access to the memory and the biometrics sensor interface, the method comprising:
prohibiting, by the sensor hub and in response to a request from an application execution environment of the computing system to capture the biometric sample, access to the memory of the computing system from the application execution environment via the operating system while permitting direct access to the memory by the biometrics component;
capturing the biometric sample from biometrics sensor to obtain biometric data;
encrypting the biometric data using a cryptographic key;
storing the encrypted biometric data in the memory;
denying access to the memory from the application execution environment via the operating system until after the biometric data is encrypted, wherein the biometrics component operatively isolates the biometrics sensor from direct access by the operating system and the application execution environment so that the biometric sample is securely captured and subsequently stored in the memory independently of the operating system; and
permitting access to the memory from the application execution environment via the operating system after the biometric sample is captured, encrypted and stored in the data storage.

11. The method of claim 10, wherein the encrypting of the biometric data is performed by a biometrics component of the computing system independently of the operating system.

12. The method of claim 10, further comprising transferring, via the operating system, the encrypted biometric data from the memory to a trusted execution environment in the application execution environment, wherein an untrusted execution environment in the application execution environment is operatively isolated from the trusted execution environment.

13. The method of claim 12, further comprising generating the cryptographic key within the trusted execution environment.

14. The method of claim 12, further comprising decrypting the encrypted biometric data using the cryptographic key within the trusted execution environment.

15. The method of claim 12, further comprising processing the biometric data to generate a biometric template within the trusted execution environment.

16. The method of claim 12, further comprising at least one of enrolling the user and authenticating the user based on the biometric data.

17. A computer program product that includes a non-transitory computer readable medium useable by one or more processors, the non-transitory computer readable medium having stored thereon instructions that when executed by the one or more processors cause a process to be carried out on a computing system having an application execution environment, an operating system, a memory selectively accessible from the application execution environment via the operating system, a biometric sensor interface configured to capture a biometric sample from a biometrics sensor, and a sensor hub separate from the operating system, the sensor hub having direct access to the memory, the process comprising:
prohibiting, by the sensor hub and in response to a request to capture the biometric sample, access to the memory of the computing system from the application execution environment via the operating system while permitting direct access to the memory by the biometrics component;
capturing the biometric sample from the biometrics sensor to obtain biometric data;
encrypting the biometric data using a cryptographic key;
storing the encrypted biometric data in the memory;
denying access to the memory from an application execution environment via the operating system until after the biometric data is encrypted, wherein the biometrics component operatively isolates the biometrics sensor from direct access by the operating system and the application execution environment so that the biometric sample is securely captured and subsequently stored in the memory independently of the operating system; and
permitting access to the memory from the application execution environment via the operating system after the biometric sample is captured, encrypted, and stored in the data storage.

18. The computer program product of claim 17, wherein the process further comprises transferring, via the operating system, the encrypted biometric data from the memory to a trusted execution environment in the application execution environment, wherein an untrusted execution environment in the application execution environment is operatively isolated from the trusted execution environment.

19. The computer program product of claim 17, wherein the process further comprises generating the cryptographic key within the trusted execution environment.

20. The computer program product of claim 17, wherein the process further comprises decrypting the encrypted biometric data using the cryptographic key within the trusted execution environment.

21. The computer program product of claim 17, wherein the process further comprises processing the biometric data to generate a biometric template within the trusted execution environment.

22. The computer program product of claim 17, wherein the process further comprises at least one of enrolling the user and authenticating the user based on the biometric data.

\* \* \* \* \*